Oct. 25, 1966  L. BALAMUTH ET AL  3,280,740
PRINTING METHODS AND APPARATUS
Filed Feb. 15, 1962  7 Sheets-Sheet 1

INVENTORS
LEWIS BALAMUTH &
ARTHUR KURIS
BY
Brumbaugh, Free, Graves & Donohue
their ATTORNEYS

FIG.3

Oct. 25, 1966  L. BALAMUTH ET AL  3,280,740

PRINTING METHODS AND APPARATUS

Filed Feb. 15, 1962  7 Sheets-Sheet 4

INVENTORS
LEWIS BALAMUTH &
ARTHUR KURIS
BY
their ATTORNEYS

INVENTORS
LEWIS BALAMUTH &
ARTHUR KURIS

United States Patent Office 3,280,740
Patented Oct. 25, 1966

3,280,740
PRINTING METHODS AND APPARATUS
Lewis Balamuth, Manhattan, and Arthur Kuris, Riverdale, N.Y., assignors to Cavitron Ultrasonics, Inc., Long Island City, N.Y., a corporation of New York
Filed Feb. 15, 1962, Ser. No. 173,528
10 Claims. (Cl. 101—426)

This invention relates to improved printing methods and apparatus, and more particularly to such methods and apparatus utilizing vibratory energy to provide improved transfer of ink to the surface to be printed.

In all printing techniques requiring the transference of an ink from a plate or image to a printing surface, the quality of the finished work is dependent in large part on the quantity of ink transferred to the receiving material during the printing process. In conventional printing presses, the receiving surface is urged against the inked image, whether plate or roll, under high pressures to secure the requisite ink transference. This requires machinery able to support rollers of considerable size and capable of applying the necessary forces to produce the high contact pressures. Furthermore, as a result of the high pressures involved, difficulties are encountered in moving the web of paper or other sheet material through the press, and in many instances, ink transference to the receiving surface is less than adequate and the finished products are lacking in clarity and contrast.

The present invention has for its primary object to provide improved printing methods and apparatus wherein the aforementioned disadvantages of conventional techniques are avoided.

An additional object of the invention is to provide improved methods and apparatus for printing at higher speeds than heretofore feasible without sacrificing clarity of print.

Another object of this invention is to provide improved printing methods and apparatus capable of efficiently utilizing relatively inexpensive papers and inks.

A further object of the present invention is to provide improved printing methods and apparatuses wherein improved transference of ink is obtained with a consequent increase in clarity and contrast of the printed matter.

Still another object of the present invention is to provide novel printing methods and apparatuses wherein the necessity for the application of high pressures against the printing plate or roll is eliminated.

Yet another object of the present invention is to provide novel printing methods and apparatuses wherein a vibratory force replaces the constant pressure applied to the printing surface in conventional printing techniques.

A still further object of this invention is to provide novel vibratory devices having particular application to the art of printing, but capable of more general use.

In reviewing presently known printing techniques, it was found that many suffered the drawback of not providing sufficient or uniform ink transfer from the inked plate or roll to the surface to be imprinted. Close inspection showed uneven patches or "snow" where large areas were printed, and blurring and uneveness of dot size in half-tone printing. Upon continued study, the present inventors found that repetitive applications of pressure, at frequencies in the sonic or ultrasonic range, might be more suitable than the constant pressure heretofore provided by large rollers which were incapable of following small surface variations in the printing plate or roll.

Early experimentation indicated that the application of vibratory energy to the printing site by a broad area tool, while an improvement over the sample pressure roller, still was not completely satisfactory. The present inventors discovered that if the repetitive pressures are applied to the back of the sheet to be printed by a narrow edge tool making essentially a line contact therewith, and the printing site and tool moved relative to one another to apply the pressures over the entire area of the printing plate or roller, vastly improved results are obtained.

In accordance with the present invention, the vibrations may be applied along the line contact perpendicular or at an angle to the plane of the sheet, or the forces may be applied to the sheet such that they follow an orbital path in a plane perpendicular to both the sheet and the line of contact. The perpendicular and parallel components of the orbitally applied pressure combine to provide a slight rubbing action in the contact area that further improves ink transference.

As an extension of the basic concept, the repetitive pressures may be applied to the sheet along two or more generally parallel line contacts, effectively doubling the total contact time. The vibratory energy along each of the line contacts may be perpendicular to, at an angle to, or orbital with respect to the plane of the sheet. In addition, the application of vibratory energy along the plurality of line contacts induces agitation or flapping of the sheet material between the contacts, thereby further enhancing the transfer of ink.

The vibratory energy is imparted to the contact area between the plate or roll and the sheet to be printed by means of vibrating tools having contact surfaces formed with one or more dependent lips. The individual tool is driven by a transducer, such as of the well-known magnetostrictive type, and mounted with the lips touching the back of the sheet material, thus providing the line contact. With each vibration stroke of the tool, pressure is applied to the sheet along the line contact, and means are provided to move either the sheet or tool relative to the other to in effect "wipe" the entire printing site with the vibratory forces. Various configurations of the tool are possible to obtain the different types of vibratory contact.

In operation, the paper or other printing surface is fed in the usual manner over the inked printing plate or roller. Instead of the impression or pressure roller, however, the vibrating tool tip is brought into engagement with the paper whereby the latter is pressed against the printing plate or roller repetitively, in accordance with the frequency of vibration of the tool. The forces applied between the paper and the inked plate or roller are such as to provide greatly improved transfer of ink to the surface, and thus the appearance of the finished printed sheet is significantly enhanced. In addition, printing may be accomplished at high speeds without blurring.

The foregoing technique is adaptable to both plate and roll printing and by means of the novel tools disclosed therein, can accommodate paper widths of any dimension. The vibratory energy available at the contact tip of the tool also makes the present invention particularly suitable for the use of dry inks, the heat developed by the vibratory energy being sufficient of itself to melt the inks at the printing site. Various shapes of tool tips are also provided to accommodate varying surfaces and sizes of printing plates and rolls. As will become apparent, the technique is suitable for both black and white and color printing.

The foregoing and other objects, features and advantages of the present invention will become more apparent from the following detailed description thereof, when taken in conjunction with the accompanying drawings in which:

FIGURE 20 illustrates the use of the invention wherein the inking material is in sheet form, as may be used in a facsimile system or the like.

It is to be understood that in the following discussion, the term "ink" is intended to include all types of materials, liquid or dry, black or colored, of any formula, capable of producing a readable imprint on a surface. The material may be in bulk form or in sheets, such as carbon paper.

Figure 1:
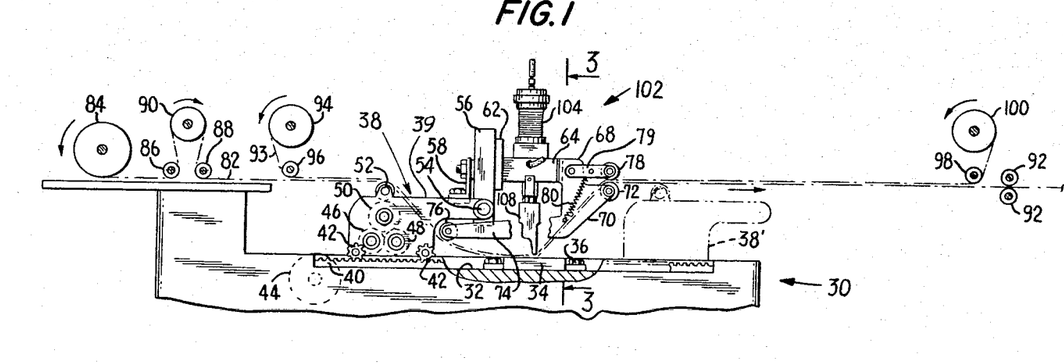
FIGURE 1 is a cross sectional view through a simplified printing press showing the manner of operation of the present invention.
Figure 2:
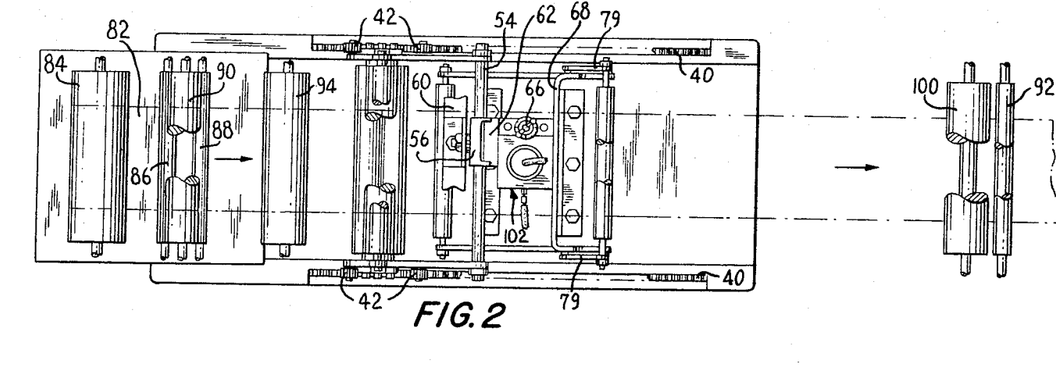
FIGURE 2 is a plan view of the apparatus shown in FIGURE 1.

Referring now to FIGURES 1 and 2, there is illustrated therein in simplified fashion, a portion of a proof press modified in accordance with the present invention. In order to illustrate the important features of the present invention most clearly, many of the details of the press itself have been eliminated from the drawing and the ensuing discussion, and only those portions thereof necessary to explain the operation have been included. As will become apparent, the present invention is adaptable to any type of printing press and the details of the press itself form no part of the invention.

The printing machine itself is indicated generally at 30 and in conventional manner is seen to include a bed 32 on which is mounted the printing or proof plate 34. The latter may be fastened to the bed 32 by means of bolts 36. A reciprocating carriage 38 having a pair of side plates 39, one mounted on either side of the bed 32, is provided in accordance with conventional printing apparatus. The longitudinal edges of the bed 32 are provided with rack gears 40 which engage pinions 42 mounted on each of the carriage plates 39. During the printing operation, the entire carriage is moved from the position at the extreme left hand or rearward end of the bed 32 to a forward position such as illustrated in dotted lines 38'.

An ink applicator roller 44 is mounted within the frame of the machine 30 and is arranged to pick up a film of ink from a suitable supply. A pair of inking rollers 46, 48 are mounted between respective carriage side plates 39 and are disposed in position to contact the roller 44 as the carriage moves from its left hand position to its forward or right hand position. The distributing roller 50 serves to assure an even supply of ink on the inking rollers 46, 48. An additional roller 52 is mounted between the carriage plates 39 at the upper edges thereof to support the web of paper or other surface to be printed as it moves through the printing machine.

Mounted on a rod 54 secured between the forwardly extending arms on the carriage plates 39 is a support block 56 for carrying the vibrating structure of the present invention. Additional support means comprising an angle bracket 58 and bar 60 extending between the carriage plates 39 maintain the support block 56 rigidly in its upright position on the carriage.

Mounted on the front face of the support block 56 in a groove provided thereon is a slidable support plate 62 to which is fastened the mounting block 64 of the transducer assembly. As represented by the micrometer dial and hand wheel 66 (FIGURE 2), the plate 62 is movable vertically with respect to the support block 56. A threaded shaft and follower nut combination or the like may be used to effect this relative motion in well known manner.

A generally U-shaped bar 68 is affixed to the forward end of the mounting block 64 to provide a roller supporting arm 70 on either side of the bed 32. A roller 72 is mounted between the forward ends of the arms 70 and an additional roller 76 is mounted between the ends of rearwardly extending portions 74. As shown in FIGURE 1, the web of paper will pass beneath the roller 76 and over the roller 72 during operation of the machine. Another roller 78 is mounted between pivot arms 79 on the forward ends of the arms 70 and urged by springs 80 with adjustable pressure against the roller 72 to grip the web as it passes therebetween.

A web of paper, or other printing material 82 is provided from a supply roll 84 at the rearward portion of the press. Tensioning rollers 86, 88 and 90 maintain the web taut as it passes through the press, in conjunction with rollers 72, 76 and 78. At the forward end of the machine, the web is withdrawn between a pair of rollers 92. As will be discussed hereinafter, it may be desirable to supply a mat or blanket 93 over the paper as it passes across the printing plate and this may be supplied from a roller such as 94. The mat may be urged into overlying relationship with the web of paper by means of a roller 96 from whence it follows the paper through the press and finally is withdrawn at roller 98 and wound on the roller 100. Alternatively, the mat may be applied in the form of an endless belt, returning for example, beneath the bed of the machine.

Figure 3:
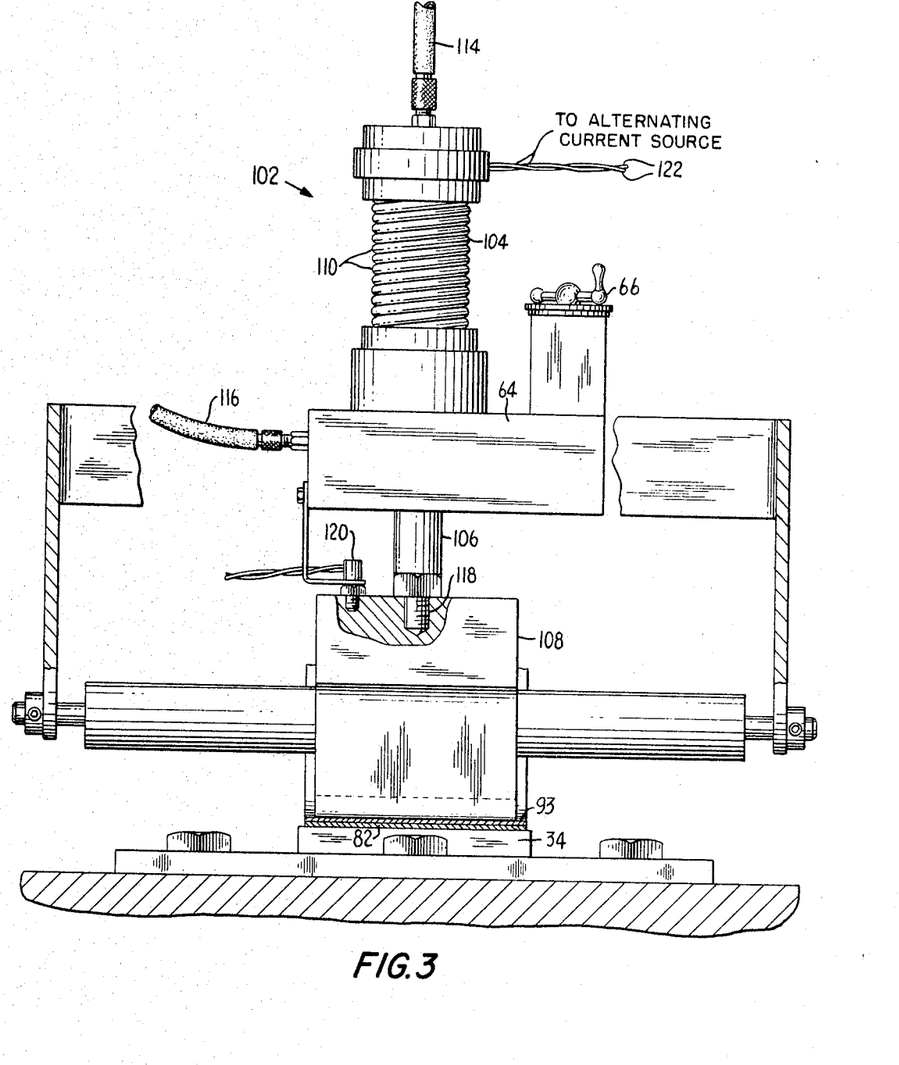
FIGURE 3 is an elevation taken along the lines 3—3 of FIGURE 1 showing one form of apparatus according to the present invention.

The transducer assembly indicated generally at 102 in FIGURES 1 and 2, is mounted in a substantially vertical position within the block 64. Referring now to FIGURE 3, the transducer assembly comprises three basic portions, a transducer 104, and connecting body 106, and a tool or output portion 108.

The transducer portion 104 and connecting body 106 preferably are of the type disclosed in applicants' copending application Serial No. 116,777, filed June 13, 1961, assigned to the present assignee, now Pat. No. 3,123,951, granted March 10, 1964, and reference may be had thereto for a complete detailed description of the apparatus. As shown in the copending application, the transducer consists essentially of a stack of elongated plates of magnetostrictive material surrounded by a coil excited from a source of alternating current. In accordance with the well known magnetostrictive effect, application of an alternating magnetic field to the plates will result in an elongation and contraction at the frequency of the alternating current. In FIGURE 3, which merely shows the external appearance of such transducer, the coil winding is indicated by the numeral 110 and alternating current at suitable frequency is applied thereto via conductors 112. The magnetostrictive stack is disposed vertically within the coil 110. To render the vibratory output of the magnetostrictive stack available for use, a connecting body 106, preferably solid and of a metal such as Monel, is rigidly fastened at one end to the stack.

Maximum transference of vibratory energy is obtained by making the connecting body of a length equal to an integral number of half wave lengths in the material of the applied frequency. The connecting body is rigidly mounted in the block 64 at a point corresponding to a node of vibration therein. A coolant may be supplied to maintain the temperature of the transducer assembly within reasonable limits through conduit 114 and circulated back out through the tube 116. As noted hereinabove, a complete discussion of the transducer and connecting body structure will be found in the aforementioned copending application.

The tool 108 is fastened to the lower end of the connecting body 106 via threaded connection 118. The tool itself preferably consists of a solid mass of material, such as Monel or aluminum, of a length equal to an integral number of half wave lengths of the applied frequency. The vibration from the connecting body 106 thereby induces a longitudinal vibration in the tool 108 having an antinode or maximum amplitude point at its lower edge.

To enable the operator to adjust and monitor the amplitude of vibration of the tool a pick-up device 120 may be provided. The pick up is disposed in operative relationship with the upper end of the tool 108 to convert the vibratory motion of the latter into electrical potentials which may be read on a meter. A suitable arrangement for such a pick up is disclosed in application Serial No. 855,932, filed November 27, 1959, for "Ultrasonic Sensing Elements," assigned to the present assignee. Such a pick up comprises a pin of magnetostrictive material fastened to the upper end of the tool member to be vibrated therewith and thus exhibit its magnetostrictive effect. Arranged in operative relationship to the pin is a coil in which potentials proportional to the flux generated in the pin are induced. The flux is proportional to amplitude of the vibration imparted to the pin by the tool, and a meter arranged to sense the potentials produced in the coil may be calibrated to read amplitude of vibration. The operator merely adjusts the alternating current supplied to the coil 110 until the meter, not shown, indicates the desired amplitude.

The vibrating tool 108 replaces the conventional pressure cylinder normally used in printing operations. As seen most clearly in FIGURES 1 and 3, in operative position, the lower edge of the tool 108 is arranged closely adjacent the upper surface of the mat 93 which in turn overlies the web of paper as it passes across the printing plate surface 34. As will be discussed in detail hereinafter, the position of the tool 108 is adjusted by means of micrometer hand wheel 66, so that in the off or non-vibrating state of the tool, the lower lip or edge is barely contacting the upper surface of the mat 93. During vibration, the requisite pressure is applied to urge the web 82 against the printing surface 84.

Referring back now to FIGURES 1 and 2, the printing operation is performed in accordance with the present invention as follows. With the carriage 38 in its most rearward or extreme left hand position, inking rollers 44 are rotating in contact with the roller 46. Ink is thus applied thereto and through the medium of distributing roller 50, also applied to roller 48. At the same time, a clean surface of paper 82 is pulled from the supply roll 84 to overlie the printing plate 34. The mat or blanket 93 is also arranged in position over the paper. It will be noted that in this position, the tool 108 is disposed rearwardly of the plate 34. With the paper and mat held firmly by their respective roller systems, the carriage 38 is moved forwardly across the printing plate 34, the rollers 52, 76, 72 and 78 permitting free movement of the carriage relative to the paper. As the rollers 46 and 48 pass over the plate, a supply of ink is transferred thereto in accordance with the image formed on the surface and the carriage is moved completely across the plate to its forward position indicated at 38'. During the entire inking procedure, the transducer assembly 102 may be raised by any well known means (not shown) relative to the printing plate to permit the paper to rise out of contact therewith. Moreover, the transducer may be rendered inoperative, such as by cutting the power thereto with suitable switching means.

With the paper and mat still held firmly, the carriage 38 is now returned to its left hand position across the plate 34. At the beginning of this passage, power is restored to the transducer 102 and as the carriage moves, the lower edge or lip of the tool 108 wipes across the surface of the mat 93, imparting repetitive pressures thereto to enable the requisite ink transference from the plate 34 to the paper 82 beneath the mat. After complete passage of the tool 108 across the mat surface overlying the plate 34, the carriage returns to its left hand position and a clean section of paper withdrawn from the roller 84 to overlie the printing plate 34. The process is now ready for repetition.

As the printed web leaves the press between the rollers 92, it may be cut or folded in any well known manner. Where wet inks are used, a drying step may also be necessary.

As discussed briefly above, during the actual printing operation, i.e., passage of the vibrating tool across the surface of the mat, the vibrating tool functions to apply pressure forces urging the paper against the surface of the plate. The initial position of the tool is adjusted so that the lower edge thereof, at its rest position, such as when the power to the transducer is cut off, barely contacts the surface of the mat or blanket 93. During the passage of the tool across the surface of the mat, the paper and mat are held taut by the roller system described above. The tautness, in conjunction with the repetitive application and removal of pressure during vibration of the tool, substantially eliminates any frictional effects from interfering with the movement of the tool across the face of the mat 93.

In U.S. Patents Nos. 3,088,343 and 3,201,967, granted May 7, 1963 and August 24, 1965, to the present inventors on application filed April 28, 1961 and February 23, 1960, respectively, and assigned to the present assignee, there are described systems employing tools vibrating in the sonic or ultrasonic range, eg.g. between approximately 1 kc./sec. and 100 kc./sec. As discussed in these patents, vibration in this range provides the high peak accelerations which are utilized in the narrow lipped vibratory tool disclosed herein to establish the intermittent pressure-low friction characteristics enabling the significantly improved results of the present invention to be obtained.

For purposes of example, during the printing operation the tool 108 may be vibrated by the transducer at a frequency in the neighborhood of 20,000 cycles per second to provide a stroke amplitude of approximately .002 inch at the tool tip as indicated by the unit. Moreover, while satisfactory results may be achieved without it, it was found preferable to interpose the mat 93 between the tool edge and the upper surface of the paper 82. The mat or blanket 93, which may be made, for example, of synthetic rice paper known by the name Troya, serves to distribute more evenly the pressure applied by the tool 108 and thereby insures contact of the paper with each and every surface variation on the printing plate 34. It will be understood that the mat or blanket may not be required in all cases, such factors as the type, quality and thickness of the paper, and type of ink determining its desirability.

In the initial work on the use of vibratory transducer means as a substitute for the conventional impression cylinder, the transducer assembly and tool were so disposed that the vibrations induced in the tool were purely longitudinal in nature and all of the vibratory energy was applied to the upper surface of the paper in a direction perpendicular to its plane. While this was found to be a substantial improvement over conventional pressure roller printing, the present inventors found that by providing a two-directional force at the surface of the paper, even better ink transference resulted. In particular, it was found that if the force applied to the upper surface of the paper or mat had a component parallel as well as perpendicular to the plane of the paper, substantial improvement in the final product was obtained. Various tools for providing both one and two component vibrations are shown in greater detail in FIGURES 4 through 12.

Figure 4:
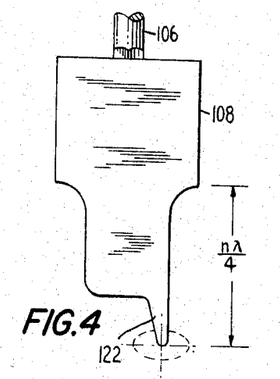
FIGURES 4, 4a and 4b illustrate one type of vibrating tool suitable for use with the present invention and are useful in explaining the basic operation thereof.

In FIGURE 4, an end view of the tool 108 shown in FIGURES 1 and 3 is illustrated. As shown, the tool comprises an upper section, a transition area and a lower section narrower than the upper section. In accordance with well known acoustic transformer principles, if the overall length of the tool 108 is $n\lambda/2$, the decreased mass of the lower half produces a longitudinal vibration therein of greater magnitude than that induced at the upper or input surface of the thicker portion of the tool. The curved transition area, if situated at the approximate midpoint of the tool, reduces the possibility of damaging strains which could interfere with its operation. The lower or output end of the tool 108 is terminated by a narrow lip 122 formed along one edge thereof. The lip is made considerably shorter than the length of the lower thin section of the tool, which is selected to be approximately half of the overall length of the tool, or $n\lambda/4$.

The lip 22 is so placed along the lower edge of the tool 108 that the mass of the tool is rendered asymmetrical about a plane through its longitudinal axis. As a result of this unbalanced mass, pure longitudinal vibrations introduced from the connecting body 106 to the input surface of the tool are converted into both longitudinal and transverse components in the lip. The combination of the transverse and longitudinal vibrations produces an orbital or elliptical motion of the lower edge of the lip 122. This is illustrated by dotted ellipse centered about the lower tip of the tool in FIGURE 4.

Figure 4A:
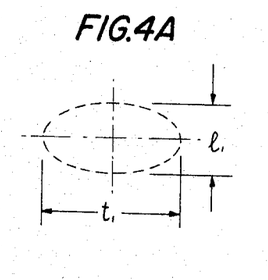
Figure 4B:
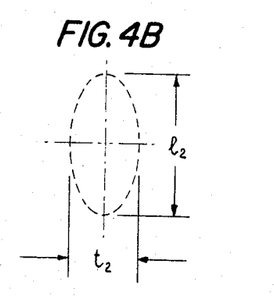

By adjusting the magnitude of the unbalancing mass, the ratio of longitudinal motion to transverse motion at the tool tip may be varied. In FIGURE 4a, for example, the mass is so adjusted as to produce a motion at the tool tip having a longitudinal component $l_1$ smaller than the transverse component $t_1$. In FIGURE 4b, an orbital motion having a longitudinal component $l_2$ considerably greater than the transverse component of $t_2$ is shown. In general, the transverse component of motion will increase as the amount of asymmetry or unbalance in the tool is increased, the longitudinal component decreasing with the increase in unbalance.

Figure 5:
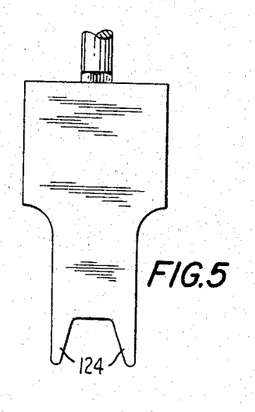
FIGURES 5 through 12 illustrate various modifications of the vibrating tool of the present invention.
Figure 6:
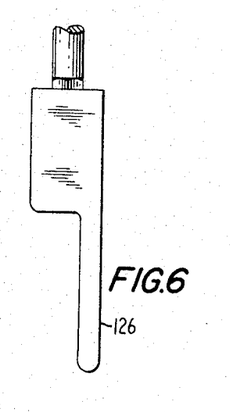

The tool illustrated in FIGURE 5 is generally similar to the tool of FIGURE 4 except that it is provided with a pair of lips 124, one along each side of its lower edge. The two lips are so disposed as to balance the tool and the vibrations at the contact edges will be substantially longitudinal. The tool of FIGURE 5 may be used in place of the tool of FIGURE 4 in the printing operation shown in FIGURES 1, 2 and 3, to provide a pair of generally parallel lines of contact along which the vibrations are applied. When so used, the nip or strip of paper intercepted between the parallel lips 124 as they move across the printing plate is caused to vibrate with a low amplitude at the frequency of vibration of the tool. Although not absolutely certain, it is believed that the nip is thus set into a flapping motion, which flapping, in addition to the repetitive pressures applied by the tool tips themselves, enables greater ink transference to the paper, especially where the plate to be printed includes many irregularities. For example, in the printing of half tone plates, wherein the image is composed of a large number of small dots, the spacing and size of which determine the shading of the printed image, the double lip tool has been found to be increased advantage. In addition, as will be explained in greater detail hereinafter, the double lip tool is particularly adapted to roll printing, i.e., wherein the printing plate is mounted on the peripheral surface of a roller rather than on a flat plate as illustrated in FIGURE 1.

Figure 7:
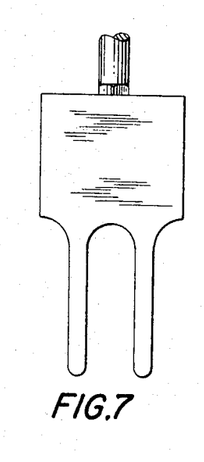
Figure 8:
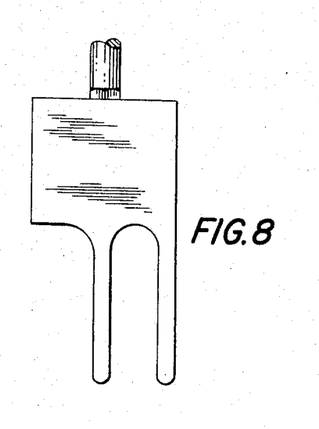

The basic tool shapes shown in FIGURES 4 and 5 are capable of many modifications, the forms of which depend upon the particular conditions under which they are to be operated and whether or not orbital vibration is desired. The tool illustrated in FIGURE 6 includes a lip 126 having a length aproximately equal to half of the tool length. The increased unbalance of mass resulting therefrom produces a two-component vibration at the lower tip of the tool. If the lip 126 is relatively thin, flexure results giving an orbital motion. If thick, an angular vibration is produced. The tools illustrated in FIGURES 7 and 8 are double-lipped tools employing the elongated lip shown in FIGURE 6. If the individual lips are made sufficiently thin, these tools will provide the advantages of both the double-lip action and orbital vibration.

Figure 9:
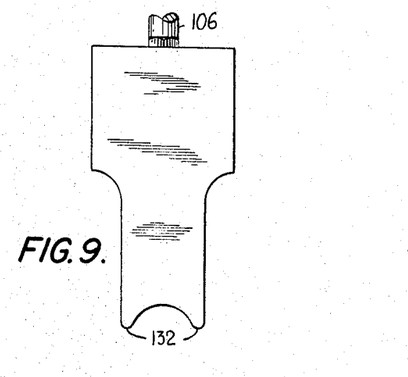

The double-lipped tool illustrated in FIGURE 9 is basically similar to that of FIGURE 5, however, the lips 132 thereof are made relatively short. The formation of the lips is a relatively simple operation, requiring only the milling or machining of a semicircular groove along the lower edge of the tool.

Figure 10:
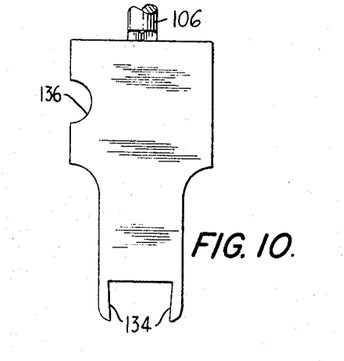
Figure 11:
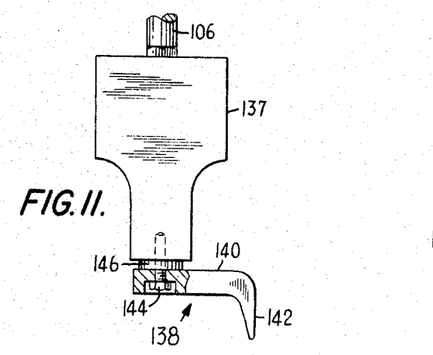

The double-lipped tool of FIGURE 10 is adapted to provide elliptical motion having a relatively large transverse component. The lips 134 thereof are formed so as to be thicker at their lower edge than at their point of juncture with the main tool body. This configuration causes a flexural action to be induced in the lips 134 which intends to increase the transverse motion of the lower ends of the lips. In addition, a groove 136 may be formed along the side of the upper or thicker portion, of the tool. As is apparent, this will provide a mass unbalance tending to heighten the transverse component of vibration at the lips 134.

Where conditions require an elliptical vibration to be produced along a line displaced laterally from the axis of the tool an amount greater than that shown in FIGURE 4, the structure of FIGURE 11 may be used. As shown therein, the tool consists of an upper portion 137 which acts as an acoustical impedance transformer in the well known manner, and a lower detachable section 138. The latter is in the form of a bar having a generally L-shaped configuration, the horizontal leg 140 thereof being larger than the vertically depending portion 142. The bar 138 is joined to the acoustical transformer 137 by means of a bolt 144 threaded into the lower end of the transformer and coaxially aligned with the connecting body 106. One or more washers or thin discs 146 of deformable metal, such as copper, are provided between the upper surface of the leg 140 and the bottom of the tool 137 to insure efficient coupling of vibratory motion therebetween. As shown, the head of the bolt 144 may be countersunk in the bar 138.

Elliptical motion is produced at the lower edge of the lip portion 142 by virtue of the intermediate flexural vibration induced in the horizontal leg 140. By adjusting the relative mass and angle of the vertical leg 142, the longitudinal and transverse portions of the resultant elliptical motion may be controlled. Since the bar portion 138 is easily removable, the tool of FIGURE 11 affords the advantage that only the lower portion 138 thereof need be replaced to accommodate different conditions of operation as opposed to replacing the entire tool structure.

Figure 12:
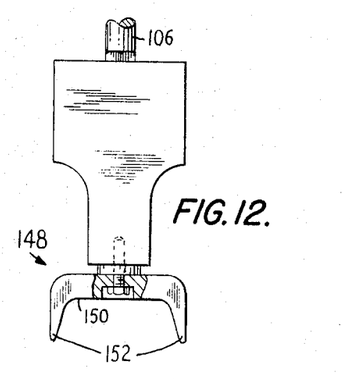

The embodiment shown in FIGURE 11 may be adapted to form a double-lipped tool, as illustrated in FIGURE 12. The lower portion 148 consists of a U-shaped bar having a horizontal section 150 and a pair of depending lips 152 along either edge thereof. As in the single lip embodiment of FIGURE 11, the lower portion 148 is fastened to the transformer section by means of a bolt coaxially arranged with the connecting body 106 and washers are provided between the two members to insure solid contact.

In the same manner as in the case of the single lip tool of FIGURE 11, elliptical vibrations are induced along the edges of each of the lips 152 by virtue of the flexural vibrations set up in the horizontal portion 150. The proportions of the elliptical motion are determined by the mass and angle of the lips 152. The embodiment of FIGURE 12 is of particular advantage where a wide spacing between the lips of the tool is required since the construction shown enables the width to be attained without the necessity of providing a large heavy one-piece tool structure. Although this tool is of particular importance in rotary printing, it may be used in flat bed printing such as shown in FIGURE 1 as well.

Figure 13:
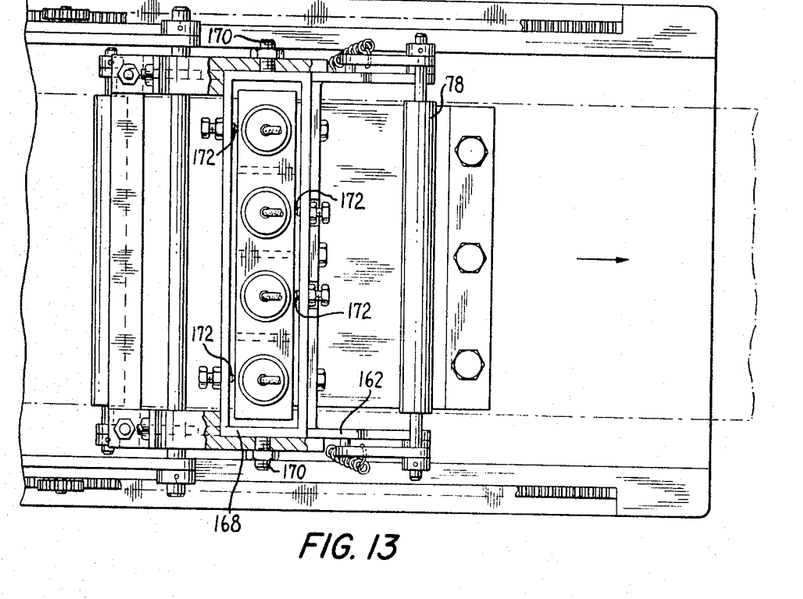
FIGURES 13 and 14 are a plane and elevation views respectively of the simplified press of FIGURE 1 provided with an elongated tool in accordance with the present invention for accommodating wider printing surfaces.
Figure 14:
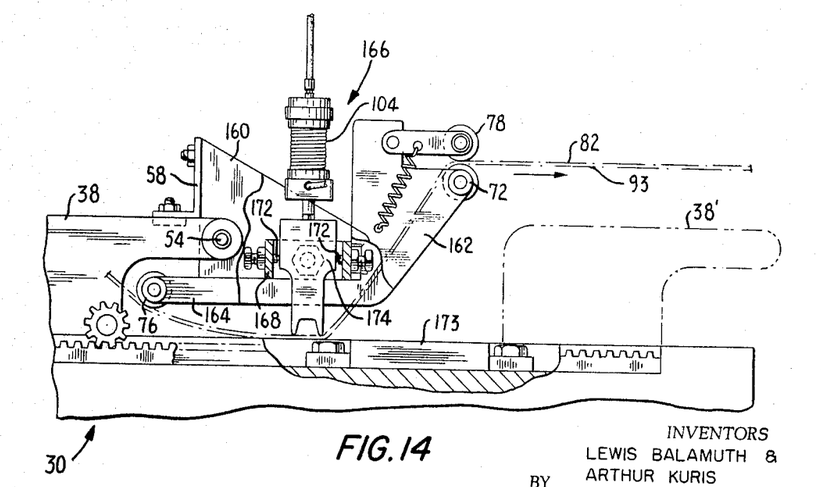
Figure 15:
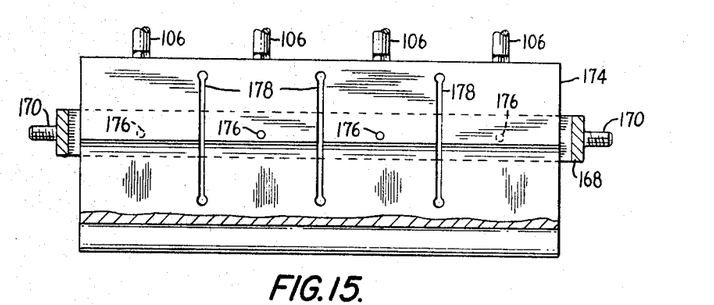
FIGURE 15 is a front view of the tool used in FIGURES 13 and 14.

In FIGURES 1, 2 and 3, apparatus according to the present invention is illustrated in an application requiring a relatively narrow tool, i.e., a tool having a short contact edge. Where such is the case, as where the paper to be printed is relatively narrow, a single solid tool element driven by a single transducer may be adequate, as seen most clearly in FIGURE 3. However, once the width of the tool exceeds certain limits, which are determined by the power supply for the transducer and the material of the tool, the tool is incapable of providing uniform vibratory motion along its lower edge. Specifically, the amplitude of vibration becomes greatest at a point immediately beneath the connection of the transducer to the tool and falls off with distance from that point. In FIGURES 13, 14 and 15, a modification of the basic tool is illustrated capable of utilization with printing surfaces of extended width.

Referring to FIGURES 13 and 14, there is shown a portion of a printing press of the type identical to that shown in FIGURES 1 and 2 adapted to support a tool of extended width. Wherever applicable, like numerals will be used in these FIGURES to illustrate comparable elements shown in FIGURES 1 and 2. The inking and roller structures have been omitted from these figures and are understood to be similar to those shown in FIGURES 1 and 2.

The shaft 54 at the forward end of the carriage 38 carries a pair of generally triangular side plates 160, each of which includes a forwardly extending portion 162, similar to the member 70 in FIGURE 1, and a rearwardly extending portion 164 equivalent to the arm 74 of FIGURE 1. The roller 76 is supported between the extremities of the latter. As in FIGURE 1, rollers 72 and 78 are supported between respective members 162. The transducer assembly 166 is carried between the triangular members 160.

As shown most clearly in FIGURE 13, the transducer assembly is mounted within a rectangular frame 168 at the ends of which are fixed a pair of threaded trunnions or studs 170. A pair of cooperating holes are provided in the members 160 to receive the studs, and nuts are provided at the outer extremity of the latter to fasten the framework between the members 160. The ends of the frame 168 may rest on a pair of ledges formed on the inner surfaces of the members 160. The entire assembly carried by the triangular members 160 may be mounted for vertical adjustment with respect to the support bracket 58 and rod 54 by any suitable means (not shown).

To support the tool and transducer assembly 166, the frame 168 is provided with a plurality of threaded studs 172 spaced along both longitudinal sides thereof. The studs 172 are threadedly engaged in the sides of the frame 168 and provided with locking nuts in well known fashion.

To accommodate the increased width of the web of paper 93 passing over the correspondingly wider type plate, the tool 174 shown in FIGURES 13 through 15 consists of an elongated bar of metal, such as Monel or aluminum which, as in the case of the tool 108 of FIGURE 1, extends transversely across the path of the web. the tool 174 is excited into vibratory motion by a plurality of individual transducers 104, all of which may be driven in synchronism from the same source of alternating current. The tool itself may have a cross section such as shown in any of the FIGURES 4 through 12, the tool shape of FIGURE 5 being shown on the apparatus in FIGURE 14 merely as exemplary of the many types available.

As shown best in FIGURE 15, the tool body 174 is provided with indents 176 on either side thereof and located at or adjacent the nodal vibration point thereof. The indents 176 are placed to receive the pointed ends of the studs 172 and, as will be appreciated, the tool will be supported thereby when the studs are tightened and locked into place by means of the associated locking nuts. The above-mentioned mounting arrangement thus carries the entire transducer assembly and rigidly supports it with respect to the bed of the press 30.

The tool illustrated in FIGURES 13, 14 and 15 is shown to consist of four driven portions, each having its own transducer and separated from each other by slots 178 which substantially, but not completely, divide the tool into separate segments. These slots effectively isolate each section of the tool from one another to minimize interaction therebetween and thus permit more uniform vibration of the contact edges of the tool. This tool structure is described in greater detail in the copending application of Balamuth et al., Serial No. 35,057, filed June 9, 1960, for "Ultrasonic Vibrated Members," and assigned to the present assignee, now Pat. No. 3,113,225, granted December 3, 1963. A tool of this type, used in printing apparatus such as illustrated in FIGURES 13 and 14, permits application of the techniques of the present invention to printing surfaces having any desired width.

Figures 16, 17, 18:
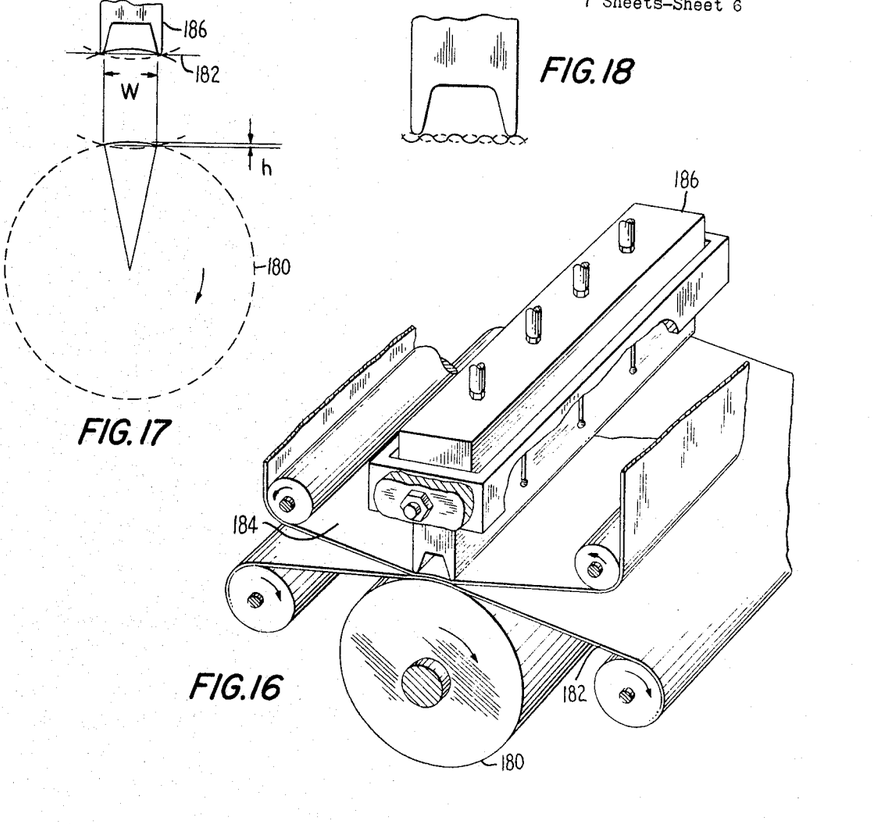
FIGURE 16 illustrates the tool of FIGURE 15 adapted for use in a roll printing application.
FIGURES 17 and 18 are diagrams useful in explaining the operation of the apparatus of FIGURE 16.

The principles of the present invention may also be applied to roll or rotary printing, as illustrated in FIGURE 16. In this type of printing, the type surface is formed on the exterior surface of a drum or roller 180. A web 182 of paper or other suitable material to be printed is arranged on a suitable roller system to contact the surface of the printing roller 180 and to move in the same direction as the periphery thereof. As discussed in connection with the printing arrangement illustrated in FIGURE 1, a mat or blanket 184 may also be provided to overlay the paper. The mat is provided with a roller system arranged to provide motion thereof concurrent with that of the web of paper.

Instead of the conventional pressure cylinder or platen, there is provided in accordance with the invention a vibratory tool indicated generally at 186, and which may be substantially identical to that discussed in connection with FIGURES 13, 14 and 15. As shown in FIGURE 16, the tool itself is preferably of the type illustrated in FIGURE 5, having a double-lipped lower edge, although a single lip tool may also be used.

In conventional rotary printing, an impression roller or cylinder applies the pressure which forces the sheet of paper against the printing plate to transfer the image thereto. If a satisfactory impression is to be made, the impression cylinder must be substantially parallel to the printing cylinder. If exact parallelism thereof could be achieved, a line contact between the cylinders could be obtained and the friction therebetween limited to pure rolling friction. However, since it is impractical to secure exact alignment, the impression cylinder is coated with a resilient material, such as hard rubber, to compensate for minor variations in alignment.

The combination of the high pressure developed by the impression cylinder and the resilient surface thereof increases the surface contacted area of the rollers on the paper considerably beyond line contact. The circumferential length or span of the surface contact area is commonly known as the "nip" in printing terminology. If the resiliency of the coating on the impression cylinder is increased, so as to accommodate a greater range of variations in alignment, the size of the nip is correspondingly increased. As the nip increases, resistance due to sliding friction is added to the already present rolling friction, thereby increasing the forces necessary to the operation of the press and tending to produce a blurring of the print. The low static pressure operation of the present invention effectively eliminates the undesirable sliding friction and adds the improved action of the vibratory forces, as described hereinabove.

Although still only theory and not yet conclusively established, the improved action of the double-lipped tool may be explained with the aid of FIGURE 17. Assuming first that the double-lipped tool 186 is withdrawn from contact with the roller 180, the web of paper 182, if held tautly across the lower edges of the lips of the tool (as indicated by the line 182) will be set into a flapping motion by vibration of the tool. The position of the paper would thus vary between the solid and dotted curved lines. The surface of the roller 180, which contains the type or printing plate, may have a variation in radius, as indicated by the dimension $h$, resulting from the variations in height of the type face as well as the aforementioned irregularities in roller size and alignment.

If now the double-lipped tool 186 is lowered to press the paper 182 against the surface of the roller, the flapping action produced in the paper by vibration of the tool will cause the paper to be repetitively pressed into contact with the roll surface over the entire nip area, thereby insuring uniform contact and ink transference. The objectionable sliding friction presented by conventional impression rollers is not present when using the double-lipped tool and the blurring effect is eliminated. Moreover, in addition to the flapping effect induced in the paper, the repetitive pressures applied by the lips of the tool effectively subject all of the paper to vibratory contact twice before it leaves the printing roller.

The extent of the flapping of the paper will depend upon the spacing $W$ of the lips of the tool, the tension under which the paper is maintained, the modulus of elasticity of the paper, and its thickness. The gap $W$ will be selected according to the diameter of the printing roller 180 and the variation of indentations $H$, which generally increase with roller diameter. An increased amount of flap, corresponding to a larger gap between lips, is desirable for a larger diameter roller where the indentations $H$ will be larger. Accordingly, it is generally preferable to increase the dimension $W$ as the size of the roller 180 increases. In this respect, the tool illustrated in FIGURE 12 is particularly desirable, since a single acoustical transformer section 137 may be utilized with a plurality of bar structures having different dimensions $W$ and, perhaps more significantly, very large gaps $W$ may be obtained without substantially increasing the mass of the tool structure.

It is believed that, depending upon the gap $W$ between the lips of the tool and the tension applied to the paper, the flapping may take the form of a plurality of waves, as illustrated in FIGURE 18. This type of flapping is equally effective as that shown in FIGURE 17 and, in the case of a roller surface having a multitude of variations in a small area, may even provide improved performance.

It will be understood that the foregoing explanation is as yet merely theoretical and the inventors do not wish to be limited thereto. Regardless of what the actual phenomena is, the above-described method and apparatus provides a notable improvement over existing printing methods.

As a result of the increased contact provided between the paper and printing roller and the decrease in frictional forces therebetween, it is possible to increase the rotating speed of the printing roller, and thus increase printing speed, without incurring any loss in quality of printed material.

Figure 19:
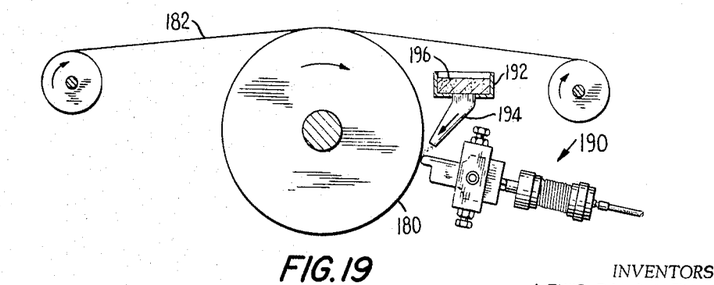
FIGURE 19 illustrates a vibrating apparatus useful with the roll printing arrangement of FIGURE 16.

Another application of the vibrating tool structure of the present invention is illustrated in FIGURE 19. As will be realized, in all of the printing operations described hereinabove, it is necessary to ink the printing plate or roller prior to application of the ultrasonic vibrations to the paper. In most printing operations, it is conventional to use a liquid ink which is applied by means of rollers to the printing surface. The ink is then applied wet to the paper, requiring a drying cycle to prevent smudging of the print. It will be obvious, of course, that elimination of this drying cycle would be desirable and some printing has been accomplished using dry ink in powdered form.

The use of dry ink presents two problems. First, a way must be provided to apply the ink evenly and rapidly to the printing plate or roller, and secondly, the printing process must be such that adequate transference of the ink from the printing surface to the paper is accomplished. In present day printing applications using dry ink, the ink is generally heated at the inking site to reduce it to a fluid state for application to the printing surface and heated again during the actual printing operation to allow it to penetrate the paper. This, of course, requires heating apparatus and at best is of limited efficiency.

The present invention not only provides the improved printing action discussed hereinabove, but as an additional feature, enables dry inks to be used with considerable facility and without the necessity of providing external heaters. As is well known, the application of vibratory energy to a surface generates heat locally in the area of contact. This is true in the case of the printing techniques herein disclosed. A certain amount of vibratory energy available at the lips of the tools is transformed into heat in the area of the nip or contact. The heat thus generated is sufficient to reduce dry powdered inks to their fluid states and thus enable complete transference from the printing plate or roller to the paper. Thus, there is no necessity for the application of additional heat at the printing site.

The vibratory apparatus of the present invention may also be utilized to simplify the inking of a printing roller or plate with powdered ink. In FIGURE 19, the application of this principle to rotary printing such as illustrated in FIGURE 16, is shown. Adjacent the printing roller 180, there is provided a transducer assembly 190 similar in all essential respects to that illustrated in FIGURES 13 through 16, and provided with a tool having a single lip, such as illustrated in FIGURE 4. The lip of the tool is so positioned with respect to the surface of the roller 180 that during vibration, it will just barely be out of contact with the surface of the roller.

Above the transducer assembly is arranged a bin 192 extending the length of the roller and including a chute portion 194 depending therefrom and having an output section adjacent the tip of the tool. Powdered ink 196 is contained in the bin and during operation of the press will flow down the chute 194 and into the minute gap between the vibrating tool and the surface of the roller 180. The vibratory action of the tool will generate sufficient heat to melt the ink 196 and cause it to adhere to the exterior surface of the printing roller. Even, complete inking of the roller is accomplished thereby.

The principles outlined above are equally applicable to both black and colored inks. Since the vibratory apparatus replaces the impression cylinder on the conventional printing press, any of the conventional printing techniques, both black and white and color, may be performed in accordance with the present invention. It will also be realized, that the printing press structure illustrated herein is in simplified form and only those details necessary to the explanation of the principles of the present invention are included.

Figure 20:
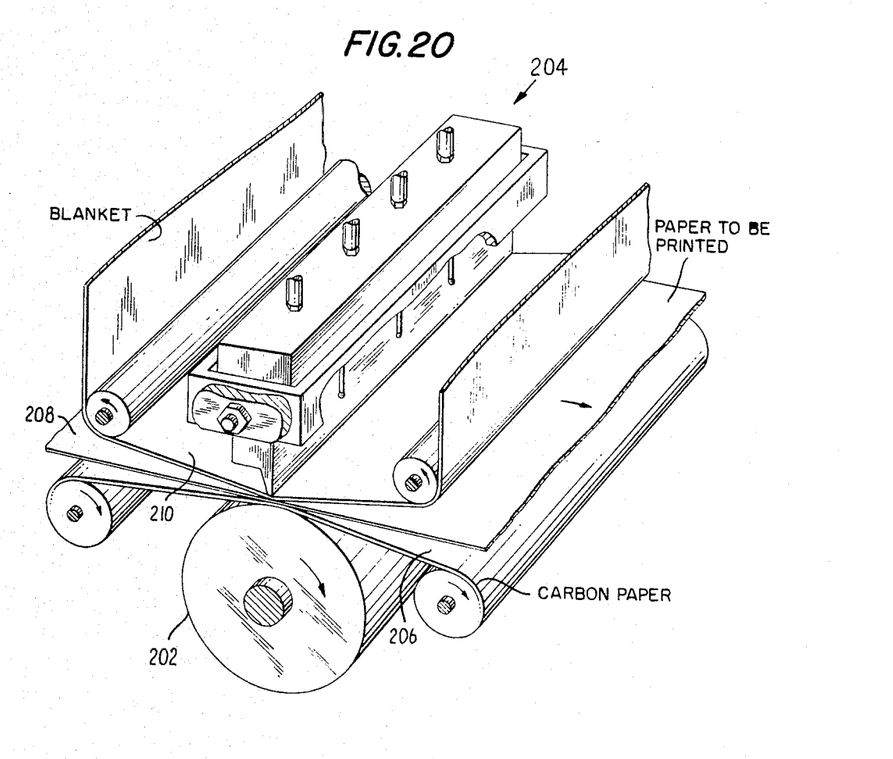

The principles of the present invention may also be adapted for use with printing apparatus of the facsimile type. For this purpose, either the type plate (or roll) or the vibrating tool may be selectively controlled by received facsimile signals. The ink used is preferably in sheet form, e.g. carbon paper, to provide a dry product. A roll printing arrangement illustrating this type of operation is shown in FIGURE 20. Between the type roller 202 and transducer 204, which is shown to include a tool of the single lip type, are disposed a sheet of carbon paper or like material 206, the paper to be printed 208, and, if desired the mat or blanket 210. The three layers are supplied from suitable rollers and are simultaneously moved over the type surface at the peripheral speed of the roller. The carbon paper functions as the ink supply and provides the imprint on the paper surface.

The tool shapes illustrated in FIGURES 4 through 12, while exemplary of prefered embodiments, by no means illustrate all of the possible modifications and many additional variations will occur to those skilled in the art.

While the invention has been particularly shown and described with reference to preferred embodiments thereof, it will be understood by those skilled in the art that various changes in form and details may be made therein without departing from the spirit and scope of the invention as defined in the appended claims.

We claim:

1. A method for producing an imprint on a sheet of thin material from an inked impression surface comprising the steps of placing said sheet of material in contact with said inked surface, applying periodically generated forces recurring at a rate of between approximately 1 kc./sec. and 100 kc./sec. to said sheet in essentially line contact therewith along a line extending transversely of said sheet and in a direction to urge said sheet against said surface, and causing said line of forces to sweep over the entire area of contact between said sheet and said surface, the frequency of recurrence of said forces being related to the speed at which said line of forces is swept over the area of contact to transfer the inked impression to said sheet line by line with substantially no space between successive lines.

2. The method of claim 1 above comprising the further step of tensioning said sheet material while in contact with said surface.

3. The method of claim 1 above wherein said forces are applied with components both parallel and perpendicular to the plane of said sheet.

4. A method of producing an imprint on a sheet of thin material from an inked impression surface, comprising the steps of placing said sheet of material in contact with said inked surface, applying periodically generating forces to said sheet simultaneously along a plurality of lines extending transversely of said sheet, said forces being in a direction to urge said sheet against said surface, and causing said lines of forces to sweep over the entire area of contact between said sheet and said surface, whereby ink from said surface is transferred to said sheet.

5. A printing method wherein the sheet to be printed is placed in contact with an inked impression-bearing surface and urged against it by a pressure-applying member having a narrow, elongated contact edge adapted to make an essentially line contact with a surface, said edge being disposed transversely of said sheet, comprising the steps of tensioning said sheet over its area of contact with said inked surface, vibrating said pressure-applying member at a frequency in a range of between approximately 1 kc./sec. and 100 kc./sec. to induce orbital vibration along its contact edge to thereby urge the sheet into closer contact with the inked surface by repetitive forces along an essentially line contact having components both parallel to and perpendicular to the plane of the sheet, and moving said contact edge while so vibrating relative to said sheet and inked surface to sweep said repetitive forces over the entire area of contact therebetween, the frequency of vibration of said pressure applying member being related to the speed at which said line of forces is swept over the area of contact to transfer the inked impression to said sheet line by line with substantially no space between successive lines.

6. In a printing apparatus wherein the sheet of material to be printed is brought into contact with an inked impression surface, means for pressing the sheet against the inked surface to provide the printed image comprising, transducer means providing a source of mechanical vibrations of a frequency in a range of between approximately 1 kc./sec. and 100 kc./sec., tool means having one end thereof coupled to said transducer to be vibrated thereby, the other end of said tool means being provided with a lip having a relatively narrow edge adapted to make an essentially line contact with a surface, means mounting said transducer and said tool on said apparatus with the narrow edge of said lip in contact with said sheet, whereby the vibration of the tool applies repetitive pressures between said sheet and said inked surface along the essentially line contact provided by said narrow edge, and means providing relative motion between said sheet and said tool to cause said narrow edge to sweep over the entire area of contact between said sheet and said inked surface at a speed related to said vibration frequency to transfer the inked impression to said sheet line by line with substantially no space between successive lines.

7. In a printing apparatus wherein the sheet of material to be printed is brought into contact with an inked impression surface, means for pressing the sheet against the inked surface to provide the printed image comprising, transducer means providing a source of mechanical vibrations, tool means having one end thereof coupled to said transducer to be vibrated thereby, the other end of said tool means being provided with a plurality of lips each having a relatively narrow edge adapted to make an essentially line contact with a surface, means mounting said transducer and said tool on said apparatus with the narrow edges of said lips in contact with said sheet, whereby the vibration of the tool applies repetitive pressures between said sheet and said inked surface along the essentially line contacts provided by said narrow edges, and means providing relative motion between said sheet and said tool to cause said narrow edges to sweep over the entire area of contact between said sheet and said inked surface.

8. Apparatus for use in printing, facsimile reproduction and the like, comprising a cylindrical roller bearing an impression to be reproduced on its peripheral surface, means for rotating said cylinder, means for providing a film of ink on said impression bearing surface, means for maintaining one side of sheet material adapted to receive the inked impression in contact with a small segment of said rotating impression bearing surface and for moving it at the same speed, pressure means having a narrow, elongated contact edge adapted to make an essentially line contact with a surface, said edge being disposed transversely of the other side of said sheet material adjacent said contact segment, and means for vibrating said contact edge at a frequency in a range of between approximately 1 kc./sec. and 100 kc./sec. to periodically urge said one side of sheet material against said ink film along an essentially line contact while said roller and said sheet material are moving, the frequency of vibration of said contact edge being related to the speed of movement of said roller and sheet material to transfer said inked impression to said sheet line by line with substantially no space between successive lines.

9. Apparatus for use in printing, facsimile reproduction and the like, comprising a cylindrical roller bearing an impression to be reproduced on its peripheral surface, means for rotating said cylinder, means for providing a film of ink on said impression bearing surface, means for maintaining one side of sheet material adapted to receive the inked impression in contact with a small segment of said rotating impression bearing surface and for moving it at the same speed, pressure means having a plurality of narrow, elongated contact edges each adapted to make an essentially line contact with the surface, said edges being disposed transversely of the other side of said sheet material adjacent said contact segment, and means for vibrating said contact edges to periodically urge said one side of said sheet material against said ink film along a plurality of essentially line contacts while said roller and said sheet material are moving, whereby ink is transferred from said impression bearing surface to said one side of the sheet material.

10. Apparatus according to claim 8 wherein the ink is provided by a sheet having an ink coatng on one surface, said sheet being disposed between said impression bearing surface and said one side of the sheet material with said ink coating against said one side of and moving at the same speed as said sheet material.

References Cited by the Examiner
UNITED STATES PATENTS

| | | | |
|---|---|---|---|
| 1,935,194 | 11/1933 | Wilsey | 101—297 |
| 2,085,325 | 6/1937 | Miller | 101—335 |
| 2,326,604 | 8/1943 | Barish | 101—32 |
| 2,339,199 | 1/1944 | Smith | 101 |
| 2,451,288 | 10/1948 | Huebner | 101—426 |
| 2,583,375 | 1/1952 | Hooper | 101—426 |
| 2,607,289 | 8/1952 | Hopkins | 101—426 X |
| 2,842,689 | 7/1958 | Harris | 310—26 |
| 2,891,178 | 6/1959 | Elmore | 310—26 |
| 2,935,940 | 5/1960 | Bronstein | 101—335 |
| 2,990,616 | 7/1961 | Balamuth et al. | 310—26 |
| 3,113,225 | 12/1963 | Kleesattel et al. | 310—26 |

DAVID KLEIN, *Primary Examiner.*

ROBERT A. LEIGHEY, *Examiner.*

F. A. LUKASIK, H. J. STRNISHA, *Assistant Examiners.*